Patented Jan. 21, 1947

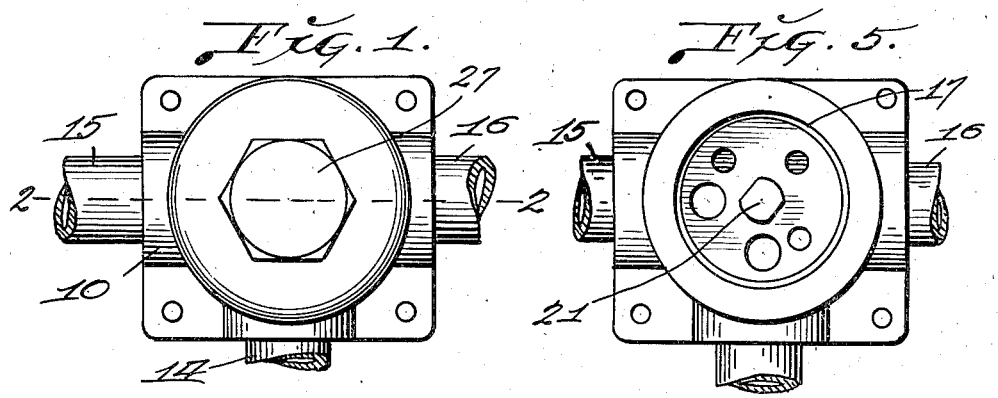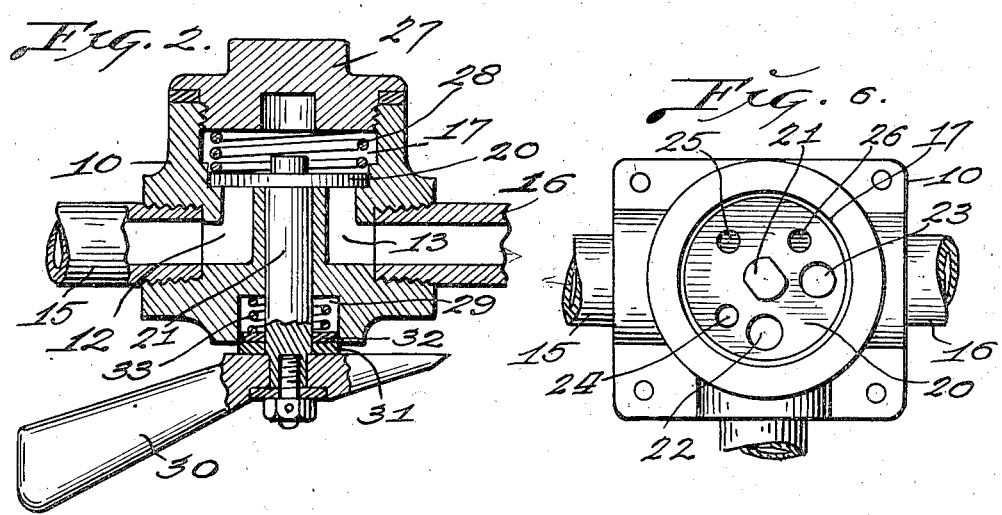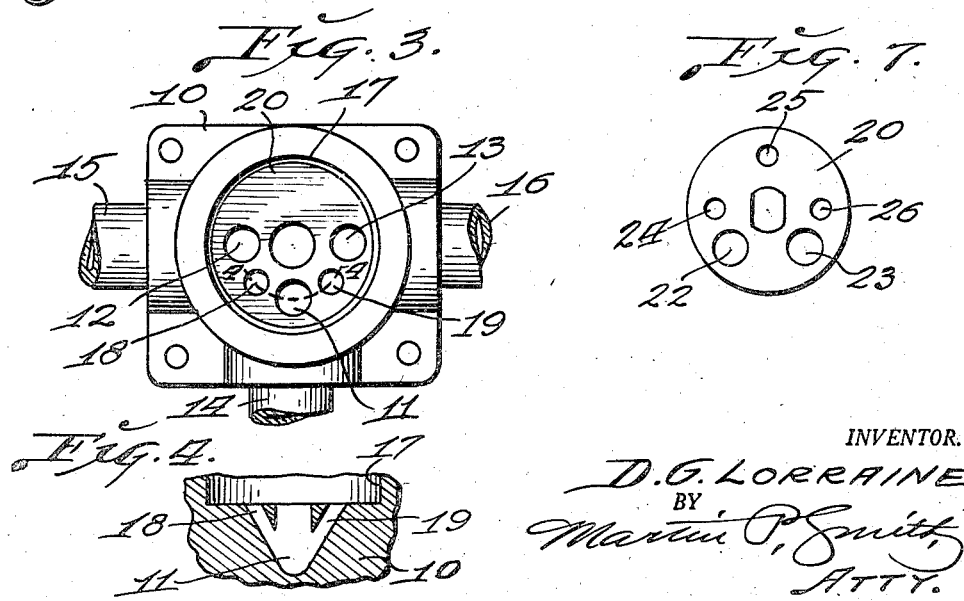

2,414,749

UNITED STATES PATENT OFFICE 2,414,749

VALVE

David G. Lorraine, La Canada, Calif., assignor of seven and one-half per cent to H. W. Elliott, Los Angeles, Calif.

Application August 6, 1943, Serial No. 497,644

9 Claims. (Cl. 251—90)

My invention relates generally to valves particularly of the three way type and has for its principal objects, to generally improve upon and simplify the construction of the existing forms of three way valves, to provide a valve which is particularly effective in the handling and control of relatively high fluid pressures, and further, to construct the valve and its operating parts so as to provide for a quick opening and closing of the stationary and movable parts without the undesirable pounding which usually attends the valvular handling of high pressure fluids.

A further object of my invention is, to provide a valve of the character referred to, having a ported disk for controlling the flow of fluid pressure through the valve housing which disk and the ports therein are constructed and arranged so as to provide ample blank or sealing areas between the ports, thereby counteracting leakage tendencies.

A further object of the invention is, to provide a simple, practical and inexpensive fluid pressure tight joint between the valve stem and valve housing.

A further object of my invention is, to construct the ported disk of the valve so that the flow of fluid pressure through the valve housing, is at no time entirely cut off while the valve is being shifted so as to direct the flow through one outlet port or the other.

With the foregoing and other objects in view, my invention consists in certain novel features of construction and arrangement of parts which will be hereinafter more fully described and claimed and illustrated in the accompanying drawing in which:

Fig. 1 is a top plan view of a valve constructed in accordance with my invention.

Fig. 2 is a vertical section taken on the line 2—2 of Fig. 1.

Fig. 3 is a plan view of the valve housing with the valve and stem removed in order to show the ports in said housing.

Fig. 4 is a detail section taken on the line 4—4 of Fig. 3.

Figs. 5 and 6 are plan views of the valve with the cap removed and showing the ported valve in different positions.

Fig. 7 is a plan view of the rotary disk.

Referring by numerals to the accompanying drawing which illustrates a preferred embodiment of my invention, 10 designates the valve housing having an inlet port 11 and a pair of outlet ports 12 and 13, with the latter disposed 180° apart and 90° from inlet port 11.

A fluid pressure supply pipe 14, connected to housing 10 communicates with inlet port 11 and branch pipes 15 and 16 connected to said housing, communicate respectively with outlet ports 12 and 13.

Formed in the upper portion of housing 10 is a chamber 17 with which the ports 11, 12 and 13 communicate and formed in the housing and leading from the lower portion of port 11 upwardly, are diverging secondary inlet ports 18 and 19 which communicate with chamber 17 at points midway between and 45° from ports 11, 12 and 13 (see Figs. 3 and 4).

The flat bottom of chamber 17 provides a seat for a rotary disk valve 20, carried by the upper end of a valve stem 21 and the latter being rotatably mounted in the center of the valve housing between the ports 11, 12 and 13. Valve 20 is provided with equal sized ports 22 and 23 disposed 90° apart and adapted to register with ports 11, 12 and 13 and said valve being also provided with three smaller ports 24, 25 and 26 disposed 90° apart and located between ports 22 and 23 with ports 24 and 26 disposed respectively 45° from said ports 22 and 23. The areas of the ports 24, 25 and 26 are approximately one half the areas of the ports 22 and 23.

A cap or screw plug 27 provides a removable closure for the chamber 17 and positioned within said chamber and bearing on the underface of said cap and the upper face of valve 20 is an expansive spring 28 which normally maintains said valve upon its seat. Disc valve 20 thus positioned, controls the flow of fluid pressure from the ports 11, 18 and 19 into the chamber 17 and from the latter to outlet ports 12 and 13.

Formed in the under side of housing 10 is a recess 29 through which valve stem 21 passes and detachably mounted on said stem below said recess, is a handle 30. Positioned on top of handle 30 around stem 21 is a metal gasket 31 and positioned on the top thereof is a washer 32 of rubber or the like, which lies wholly within the recess and positioned between said washer and the bottom of recess 29 is an expansive coil spring 33.

The construction just described is comparatively simple, provides a highly efficient fluid pressure tight joint between the valve stem and housing and takes the place of a conventional stuffing box or packing gland. In the use of my improved valve, handle 30 is manipulated to rotate stem 21 and valve 20 and when said valve is positioned as illustrated in Fig. 5 with port 23 in registration with inlet port 11, port 22 in registration with outlet port 12 and port 26 in registration with port 19, fluid pressure will flow from supply pipe 14 through the registering ports to outlet port 12 and pipe 15 connected thereto.

When the valve is shifted into the position illustrated in Fig. 6, fluid pressure will flow from supply pipe 14 through inlet ports 11 and 18, valve ports 23 and 13 and thence to and through pipe 16.

Thus, with a 90° travel, the valve moves from one full open position to the other and the provision of the branch inlet ports 18 and 19, the positions thereof relative to the ports 11, 12 and 13 and the radial spacing of the ports in both housing and valve, provides for a practically constant flow of fluid pressure through the valve as the same is shifted from one position to the other. Such provision eliminates the pounding which would otherwise occur if the flow of fluid pressure is entirely cut off, even for an instant, while the valve is being shifted from one position to another.

Further, the provision of ports 18 and 19 are in effect secondary inlet ports, tends to prevent binding of the rotary valve during operation, thus enabling same to be readily shifted from one position to another while controlling the flow of fluids under high pressures.

Inasmuch as rotary disc valve 20 is subject to a certain amount of fluid pressure on its underface and on its upper face, to the combined pressure of spring 28 and the pressure of the fluid within chamber 17, and as the admission ports are never entirely closed, said valve is semi-balanced.

The great degree of pressure prevailing in chamber 17 creates end thrust on the disc valve so as to produce and maintain fluid pressure-tight joints between said valve and the face of the housing upon which the valve bears and also providing fluid pressure-tight joints between the valve stem 21, its bearing in the housing and the closed discharge ports.

It is to be noted that the fluid pressure entering the valve housing, passes through the disc valve in one direction and then passes through said disc in the opposite direction before discharging from the housing.

Thus it will be seen that I have provided a valve which is simple in structure, inexpensive of manufacture and very effective in performing the functions for which it is intended, viz. the rapid and efficient flow control of fluids under high pressures.

It will be understood that minor changes in the size, form and construction of the various parts of my improved three-way valve may be made and substituted for those herein shown and described without departing from the spirit of the invention, the scope of which is set forth in the appended claims.

I claim as my invention:

1. In a valve, a housing having an inlet port, a pair of outlet ports and a pair of secondary inlet ports leading upwardly from said inlet port below the outlet end thereof, the outlet ends of which secondary inlet ports are disposed between said inlet port and said outlet ports, a disk valve arranged for rotation within said housing and having ports for controlling the flow of fluid pressure from said inlet port and secondary inlet ports to said outlet ports, a stem extending from said disc valve downwardly through said housing, a handle mounted on the lower end of said stem, packing members on said stem between said handle and housing and an expansive spring between said housing and said packing members.

2. A valve as set forth in claim 1 and an expansive spring bearing on top of said disk valve.

3. In a valve, a housing having an inlet port, a pair of outlet ports, and a pair of secondary inlet ports the latter diverging upwardly from a point below the discharge end of said inlet port and disposed on opposite sides thereof, a valve mounted for rotation within said housing, said valve having a pair of ports adapted to register with the inlet and outlet ports in said housing and having other ports which are adapted to register with said secondary inlet ports, a stem extending from said valve downwardly through said housing, there being a recess in the lower portion of said housing around said stem, a handle on the lower end of said stem below said recess, a packing member on said stem within the lower portion of said recess and an expansive spring within said recess and bearing on said packing member.

4. In a valve, a housing having an inlet port, a pair of outlet ports and a pair of secondary inlet ports the latter diverging upwardly from a point below the discharge end of said inlet port and on opposite sides thereof, a valve mounted for rotation within said housing and provided with ports arranged so that when in one position, the inlet port and one secondary port are in communication with one of said outlet ports and when in another position said inlet port and another one of said secondary ports are in communication with the other one of said outlet ports, a stem extending from said valve downwardly through said housing, an expansive spring bearing on said valve, means mounted on the lower portion of said stem for actuating same and means for imparting downward strains to said stem and valve.

5. In a valve, a housing having an inlet port, a pair of secondary inlet ports the latter diverging from said inlet port near its outlet end, a pair of outlet ports and a valve chamber with which said ports communicate, said valve chamber having a valve seat the discharge ends of said inlet port, secondary inlet ports and the inlet ends of said outlet ports, all occupying the same plane with said valve seat, a valve mounted for operation on said seat and provided with ports for controlling fluid flow from said inlet and secondary inlet ports to said outlet ports the ports in said valve being disposed so that when either one of the outlet ports in the housing is open, the inlet port and one of the secondary inlet ports in the housing are open and a spring for maintaining said valve upon its seat.

6. A valve as set forth in claim 5, with a stem on which said valve is mounted, a handle on said stem and means providing a fluid pressure tight joint between said stem and housing.

7. In a valve, a housing provided with a chamber and admission ports and discharge ports, all communicating with the same side of said chamber, a rotary disc valve arranged for operation within said chamber and bearing against the side with which said admission and discharge ports communicate, said valve having admission and discharge ports of different size and arranged so that fluid pressure passes through the rotary disc valve in one direction and discharges therethrough in the opposite direction, a spring bearing on said valve, a stem extending from said valve downwardly through said housing, a packing member between said stem and housing and a spring between said housing and said packing member.

8. In a valve, a housing having a chamber, a pair of inlet ports and an outlet port communicating with the bottom of said chamber, branch inlet ports leading from said inlet port, below its discharge end, to the bottom of said inlet port and a rotary valve arranged for operation within said chamber and having ports for controlling the flow of fluid to and from said chamber.

9. A valve as set forth in claim 8 with means for rotating said valve.

DAVID G. LORRAINE.